Patented Feb. 19, 1929.

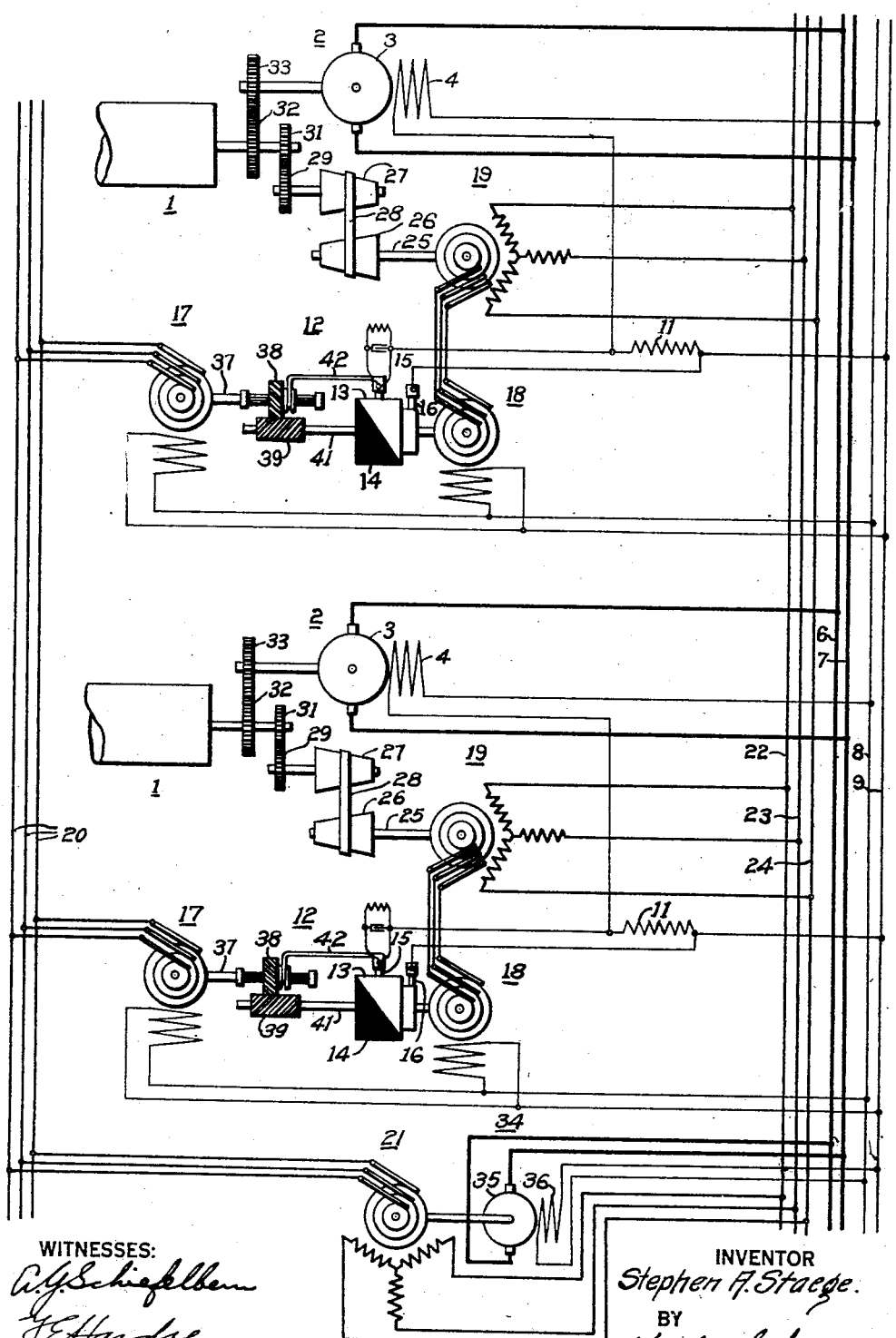

1,702,486

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed October 14, 1924. Serial No. 743,577.

My invention relates to speed regulator systems and it has special relation to improved means for establishing and automatically maintaining the desired speed relation of the separate driving motors for the speed units of a paper-making machine, or the like.

The usual paper-making machine comprises a plurality of rolls, the proper relative speeds of which must be maintained for a given paper-making operation. It is necessary, under certain circumstances, to change the speeds of the rolls, as, for example, when paper of a different weight is desired. The raw material or pulp is supplied to what is known as the "wet end" of the paper-making machine, where it is collected into a thin sheet while in a moistened state. This sheet is conveyed to the succeeding parts of the machine, which function to drive the moisture out and form it into paper. The several sets of rolls are run at slightly different speeds to accommodate the "draw" or elongation of the sheet during its travel from the "wet end" to the "dry end" of the machine. During the paper-making operation, any substantial departure from the desired speed harmony between the rolls result in injuring the paper produce, which is, of course, in a fragile condition.

One object of my invention is the provision of means whereby the speed of each of the separate driving motors of the machine may be independently adjusted while the machines are operating, and the speeds thus established may be automatically maintained.

Another object of my invention is to provide regulators for the several section-driving motors of a paper-making machine which shall maintain a constant speed ratio between each section motor and a master motor, or other speed-reference means.

A further object of the invention is to provide a regulator of the above-indicated character, wherein the regulating effect upon the controlled section motor with respect to that of the speed reference means shall be cumulative.

A further object of my invention is to provide means of such character that the section motors shall have a full field strength upon starting, the field strength being automatically adjusted to bring each motor to its proper speed.

A still further object of the invention is to provide means whereby the several regulators for the different section-motors may have different rates of regulation, respectively adapted to best accommodate the characteristics of the several sections.

Referring to the accompanying drawing, the single figure illustrates a schematic view of a system and apparatus embodying my invention.

A paper-making machine is illustrated, comprising a plurality of rolls 1, each roll being driven by a direct-current section motor 2 that is provided with an armature winding 3 and a field winding 4. The section motor armature windings are connected to an adjustable-voltage source of direct-current 6—7. The field windings are connected to a constant-voltage source of direct-current 8—9. In series-circuit relation with each motor field winding is connected a resistor 11, the terminals of which are connected to a rotary contactor device 12, which is operated to intermittently short-circuit the resistor for longer or shorter periods of time, and thereby vary the effective value thereof.

The rotary contactor 12 is provided with a triangular or tapered conducting segment 13 and a complementary non-conducting segment 14, over which a brush 15, which is connected to one terminal of the resistor 11, travels. A second brush 16 connects the conducting segment 13 to the other terminal of the resistor 11. The rotary contactor is differentially operated with respect to a synchronous motor 17 and a synchronous motor 18. The synchronous motor 17 which is connected to a three-phase circuit 20, operates at a constant speed for any given voltage of the supply circuit 6—7, which controls the speed of the master frequency changer 21, as hereinafter explained. The synchronous motor 18 is operated in accordance with the frequency supplied from a section frequency changer 19, which is energized from a constant frequency source 22—23—24. The section frequency changer 19 is operated in accordance with the speed of its associated section motor 2, through shaft 25, cone pulleys and belt 26, 27 and 28, respectively, and gear-wheels 29, 31, 32 and 33.

The master frequency changer 21, which supplies energy to the circuit 20, is operated by a direct-current motor 34 having an armature winding 35 and a field winding 36. The armature winding 35 is connected to the adjustable voltage direct-current supply source 6—7, thus being in parallel circuit relation to the armatures of the section motors 2. The field winding 36 is connected to the constant voltage direct-current supply source 8—9, thus being in parallel circuit relation to the field windings of the section motors. The synchronous motor 17 is provided with a shaft 37 upon which is slidably mounted a helical gear-wheel 38, which meshes with another helical gear-wheel 39 that is mounted upon the shaft 41 of the rotary contactor 12. The gear-wheel 39 is driven in accordance with the speed of the synchronous motor 18, which drives the drum of the rotary contactor. The gear-wheel 38 is operatively connected, by means of a link or rod 42, to the brush 15.

The operation of the system is as follows:

Each synchronous motor 17 operates one side of the corresponding differential device that is interposed between each pair of motors 17 and 18, the motor 17 being driven at a constant speed for any given frequency of the circuit 20. Each synchronous motor 18 is driven in accordance with the frequency supplied by the associated frequency-changer 19, which is driven in accordance with the speed of the corresponding section motor 2. Should the speed of the synchronous motors 17 and 18 vary with respect to each other, the helical gear-wheel 38, while meshing with the gear-wheel 39, will be moved laterally to actuate the brush 15 so as to effect a short-circuit of the resistor 11 for a shorter or a longer period during each revolution of the contactor drum. This variation in the percentage of time that the field resistor is short circuited, varies the effective value of the resistor and therefore the field strength of the motor. The effect of shifting the brush 15 is to increase the speed of the corresponding section motor 2, as the synchronous motor 18 drops below the synchronous motor 17 in speed or to decrease the speed of the section motor, as the synchronous motor 18 operates at a speed above that of the synchronous motor 17, until such a position of the brush 15 is established that the section motor field current is of the value necessary to maintain the motors 17 and 18 in synchronism, when no sliding movement of the gear-wheel 38 occurs.

In order to change the established speed ratio between the several rolls 1, the position of one of the belts 28 upon the corresponding cone pulleys 26 and 27 may be altered. This change varies the frequency of the current supplied to the synchronous motor 18 from the section frequency changer 19, tending to produce different relative speeds of the synchronous motors 17 and 18, which tendency is overcome by the changed position of the brush 15 resulting therefrom, thus establishing a new field strength for the corresponding section motor, causing it to operate at a different speed corresponding to the new position of the belt on the cone pulleys of the speed changer device.

When it is desired to vary the speed of the entire paper machine, the voltage supplied to the section motor armatures by means of conductors 6—7 may be varied. This variation in armature voltage automatically varies the speed of the section motors 2 and also of the master motor 34, thereby establishing a new frequency for the circuit 20. Since the change in frequency of the adjustable frequency source 20 is proportional to the change in the speed of the motor 34, which is also substantially proportional to the change in the speed of the section motors, it follows that the rotary contactor devices 12 function to maintain the motors 2 in the same speed ratio that existed at the former paper machine speed. In other words, the speed of the entire machine may be raised or lowered by raising or lowering the voltage of the conductors 6—7, without changing the speed ratios between the several section motors.

Each section motor operates, in the case of load changes thereon, similarly to a synchronous motor. As an increased load comes on the particular section motor, this motor will have a tendency to slow down slightly, thereby causing the associated synchronous motor 18 to slow down correspondingly. This variation in speed of the synchronous motor 18 causes the position of the brush 15 to be changed to weaken the field strength of the section motor, so as to cause it to maintain its proper speed with the new load. Since it is necessary to maintain a different field strength for the section motor under different loads in order to maintain a fixed speed relation between that motor and the master motor 34, a change in load upon any section motor causes this motor to vary its phase angle sufficiently to produce the required change in the setting of the brush 15. The revolutions per minute of the motor 2 will not be changed by changes in load thereon, but the phase angle between the section motor and the master motor will change the amount necessary to establish the proper field strength. The effect of the regulator is therefore cumulative. A change in the motor speed with respect to the master, will cause a variation in the position of the brush upon the rotary contactor which will continue until the proper speed relation is again established.

The use of the differential gear wheels 38 and 39, having engaging helical teeth, permits varying the rate of regulation of one section with respect to that of another section by providing gear wheels of different pitch. By changing the pitch of the helical gears, the rate at which the brush 15 will slide upon the drum of the rotary contactor 12 is varied. This function is desirable, since certain sections of the paper machine have greater inertia than other sections, and respond less quickly to a given change in field strength of the driving motor.

Many modifications of the system and apparatus illustrated herein as embodying my invention may be made within the spirit thereof, and I do not wish to be limited except in accordance with the scope of the appended claims.

I claim as my invention:

1. In a regulator system, the combination comprising a plurality of dynamo-electric machines, each having a resistor in circuit therewith, of means for controlling the speeds of said machines comprising a rotary contactor and cooperating brush for each machine for varying the effective value of said resistor, and means for controlling the relative position of said rotary contactor and brush, said several means having different and changeable rates of response to speed variations of the controlled machines.

2. In a regulator system, the combination comprising a plurality of dynamo-electric machines, each having a field winding and a resistor in circuit therewith, of means for controlling the speeds of said machines comprising a cooperating rotary contactor and brush for varying the effective value of said resistor, and differential means for controlling the relative position of said brush and rotary contactor, said differential means comprising a pair of cooperating gears that are replaceable by other pairs of gears of different pitch for varying the rate of response of said differential means.

3. In a regulator system, the combination comprising a plurality of dynamo-electric machines, each having a field winding and a resistor in circuit therewith, of means for varying the effective values of said resistors for regulating the speeds of said machines comprising pairs of cooperating gears associated with each machine, said pairs of gears being replaceable by other pairs of gears of different pitch for varying the rate of response of said regulating means.

4. In a regulator system, the combination comprising a plurality of dynamo-electric machines, each having a field winding and a resistor in circuit therewith, of means for varying the effective values of said resistors for regulating the speeds of said machines comprising a differential device associated with each machine, said several differential devices having different rates of response to speed variations of their respective machines.

5. In a regulating system, regulating means comprising a pair of frequency-changers, a synchronous machine connected to each frequency-changer, a commutator actuated in accordance with the speed of one of said frequency-changers, a brush resting on said commutator, and means for varying the position of said brush in accordance with a variation in the speeds of said synchronous machines.

6. In a regulator system, a dynamo-electric machine having a field winding and a resistor in series circuit relation therewith, a frequency-changer associated with said machine, a master motor and a frequency-changer associated therewith, means for varying the effective value of said resistor comprising a rotary contactor and a cooperating brush therefor, means for operating said rotary contactor in accordance with the speed of one of said frequency-changers, and means differentially responsive to the speeds of said frequency-changers for varying the position of said brush.

7. In a regulator system, a dynamo-electric machine having a field winding and a resistor in series circuit relation therewith, a frequency-changer associated with said machine, a master motor and a frequency-changer associated therewith, means for varying the effective value of said resistor comprising a rotary contactor and a cooperating brush therefor, means for operating said rotary contactor comprising means actuated in synchronism with the operation of said frequency-changers, and means differentially responsive thereto for actuating said contactor and brush.

8. In a regulator system, a plurality of elements required to run in fixed but adjustable speed relation, a plurality of direct current motors for driving said elements, said motors being provided with field windings and resistors in series therewith, means associated with each motor for varying the effective value of the motor field resistor, said means comprising two synchronous motors and a rotary contactor differentially responsive to the speeds of said synchronous motors.

9. In a regulator system, a plurality of elements required to run in fixed but adjustable speed relation, a plurality of direct current motors for driving said elements, said motors being provided with field windings and resistors in series therewith, means associated with each motor for varying the effective value of the motor field resistor, said means comprising two synchronous motors and a rotary contactor differentially responsive to the speeds of said synchronous motors one of said synchronous motors being responsive to the speed of its associated direct current motor.

10. In a regulator system, a plurality of elements required to run in fixed but adjustable speed relation, a plurality of direct current motors for driving said elements, said motors being provided with field windings and resistors in series therewith, means associated with each motor for varying the effective value of the motor field resistor, said means comprising two synchronous motors and a rotary contactor differentially responsive to the speeds of said synchronous motors, a frequency-changer associated with each direct current motor and actuated in accordance with the speed thereof, speed-changing devices connected between said frequency-changers and motors, said frequency-changers being connected to one of the associated synchronous motors.

In testimony whereof, I have hereunto subscribed my name this 9th day of October 1924.

STEPHEN A. STAEGE.